Patented Apr. 26, 1927.

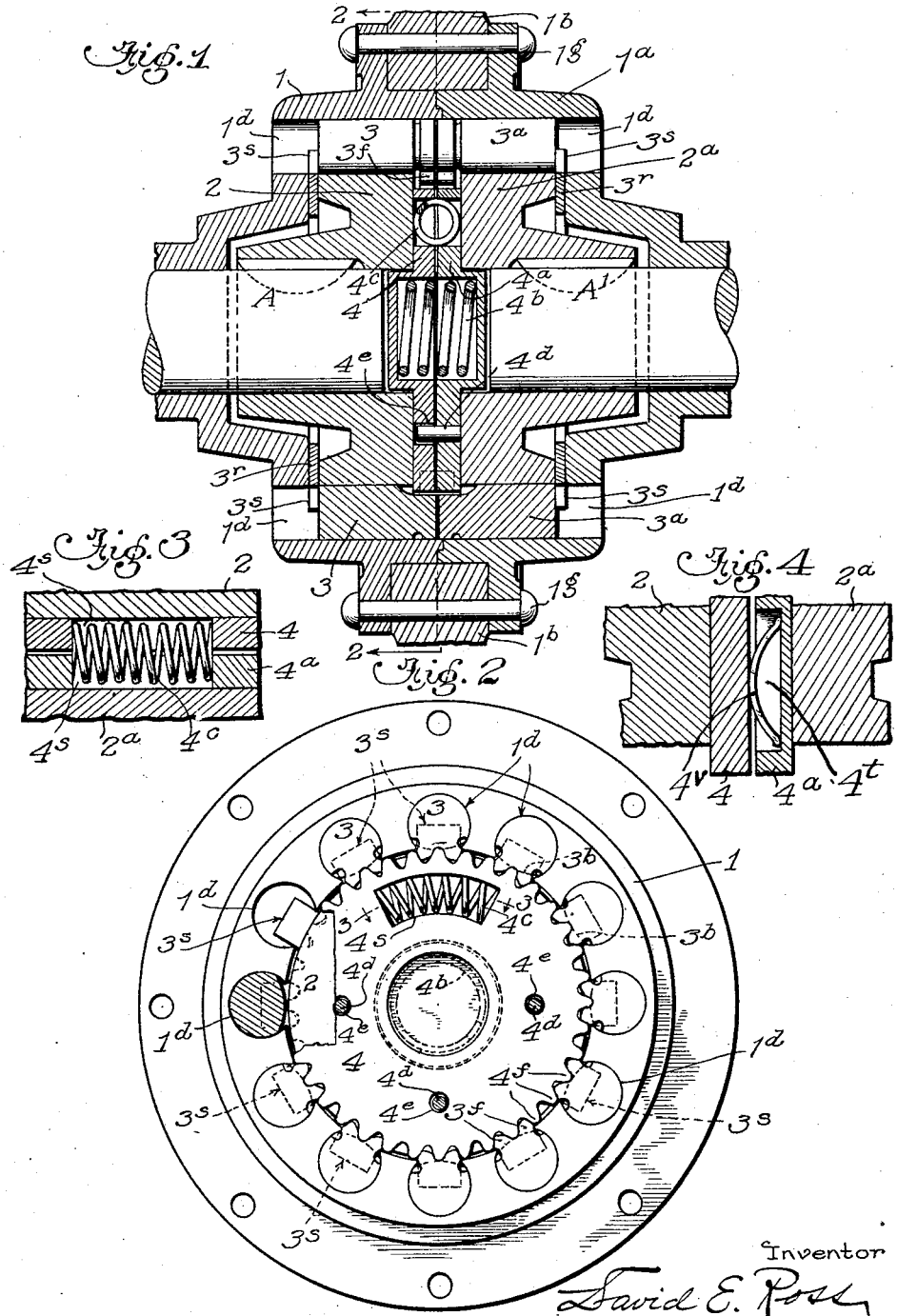

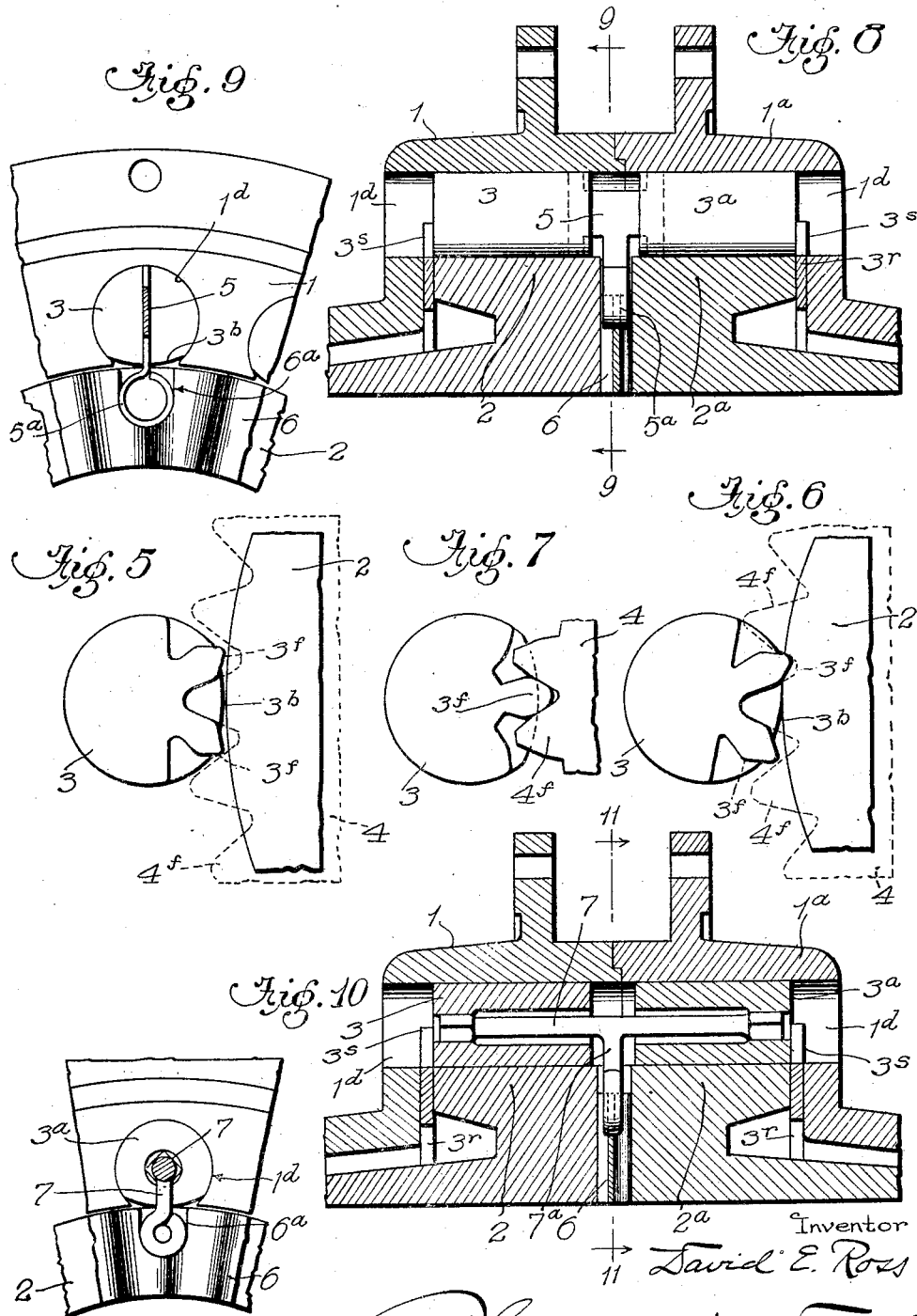

1,626,156

UNITED STATES PATENT OFFICE.

DAVID E. ROSS, OF LA FAYETTE, INDIANA.

COMPENSATING GEARING.

Application filed February 29, 1924. Serial No. 696,019.

This invention is a novel compensating gear particularly designed for use in the rear axle of automobiles and the like; and the principal object of the invention is to produce an inexpensive compensating mechanism so designed that it will prevent spinning of one drive wheel faster than the other when the vehicle is moving straight ahead, but will permit the necessary unequal rotation of the wheels when the vehicle is turning.

The novel compensating gear in brief comprises two opposed compensating disks respectively fixedly attached to the adjacent inner ends of alined axle sections; an outer casing or driving member rotatably mounted upon the axle sections and enclosing said disks; a series of preferably rocking cams arranged between each disk and the housing; and means operatively mounted between the disks and shiftable thereby whereby the cams are caused to lock both disks to the driving member when the disks are turning at uniform speed; and by which if one disk is retarded or the other disk is accelerated (as in turning the vehicle), the locking cams will be caused to release the faster disk until the disks can resume practically uniform speed of rotation, as when the vehicle again moves directly forward.

More specifically, the preferred form of compensating gear comprises an outer driving member containing two concentric series of rocking cams adjacent its inner periphery adapted to engage the outer peripheries of two circular disks within the housing and respectively attached to the adjacent inner ends of alined axle sections; frictional means interposed between the disks adapted to be shifted rotatorily and rock the cams; and means for permitting the cams of one compensating disk to rotate to the point of release when the machine is turning; means are also provided to limit the releasing movement of the cams so they cannot improperly lock reversely; and means for returning the cams of the compensating disks at the proper time to the same radial position as the cams that are driving the other disk.

I will explain the invention with reference to the accompanying drawings which illustrate practical embodiments of the invention to enable others to understand and use the same; and refer to the claims for summaries of the essentials of the invention, and of novel features of construction and novel combinations of parts therein, for all of which protection is desired.

In the accompanying drawings:

Figure 1 is a vertical section through the at present preferred form of compensating gear.

Figure 2 is a transverse sectional view through the gear on the line 2—2, Fig. 1.

Figure 3 is a detail sectional view through the friction members 4, 4$^a$ on the line 3—3, Fig. 2.

Figure 4 is a detail sectional view through the friction members 4, 4$^a$ showing a slight modification.

Figures 5 and 6 are detail diagrammatic views illustrating the action of the cam members shown in Fig. 1.

Figure 7 is a view illustrating a slight modification of the cam members.

Figure 8 is a sectional view illustrating a modification of the rocking cams and their actuating devices.

Figure 9 is a detail sectional view on the line 9—9, Fig. 8.

Fig. 10 is a sectional view illustrating another modification of the rocking cams and their actuating devices.

Figure 11 is a detail sectional view on the line 11—11, Fig. 10.

In the drawings I have conventionally illustrated the compensating gear as applied to the driving axle of an automobile. This axle comprises opposite alined sections A, A' on the inner ends of which are mounted similar opposed disks 2, 2$^a$, which disks are enclosed within a rotatable driving member or housing, each disk being independently interlocked with the housing by means of an annular series of related preferably rocking cam members 3, 3$^a$ arranged and adapted to operate as hereinafter explained.

The housing of the gear may be of any desired kind, and rotated by any suitable means, such as are commonly employed. As shown in Figs. 1 to 7, the housing is composed of opposite similar complemental halves 1, 1$^a$ united by bolts 1$^g$, which also secure a gear 1$^b$ of any desired kind to the housing; which gear may be driven as usual from the engine by any suitable means (not shown); the particular means for driving the housing not forming a feature of the invention.

The housing members 1, 1$^a$ are rotatably mounted on the shaft sections A, A' in any suitable manner, or as usual in such drives; the inner ends of axle sections A, A′ abutting within the housing. The axle sections may be connected at their outer ends to the drive wheels of the vehicle (not shown) as usual.

Fixedly attached to the inner ends of the respective axle sections A, A′ within the housing 1 are opposed circular compensating disks 2 and $2^a$. The disk 2 is attached to the left-hand axle section A, and the disk $2^a$ is attached to the right-hand axle section A′. The means for fastening the disks to the axle sections may be of any suitable kind.

The inner peripheries of the housing members 1, $1^a$ are truly cylindric and concentric to the axes of the axle sections A, A′; and in each section 1, $1^a$, adjacent the inner periphery thereof, are formed a series of bores or sockets $1^d$ whose axes are parallel with the axes of the housing members and shaft A, A′. The bores $1^d$ are cylindric, but are so cut in the members 1, $1^a$ that the bores open at their inner sides into the housing as shown in Figs. 2, 9 and 10.

Each disk 2, $2^a$ is truly cylindric on its outer face and is of a diameter to have a close but running fit within the cylindric interior of the housing.

In the bores or sockets $1^d$ in the housing members 1, $1^a$, are accurately fitted cylindric rocking cams or clutch elements 3, $3^a$, which are adapted to interlock the housing 1 and the compensating disks 2, $2^a$.

The cams 3, $3^a$ if truly cylindric would always partly project through the open inner sides of the bores and therefore would always bind or lock the disks 2, $2^a$ to the housing. In other words the axes of the cylindric bores $1^d$ are slightly too near the center of the disks 2, $2^a$ to permit of truly cylindric cams 3, $3^a$ being used in the bores without binding disks 2, $2^a$ in the housing. Therefore, the cylindric cams 3, $3^a$ are somewhat flattened or oblated on their inner sides, as indicated at $3^b$ in Figs. 2, 5 and 6 adjacent the disks, 2, $2^a$, so that when the cams 3, $3^a$ are so positioned in the bores that their flattened or segmental portions $3^b$ are directly opposite the disks 2, $2^a$ (as in Fig. 5) they will not interfere with the rotation of the disks in the housing or vice versa. This flattening of one side of the cams 3, $3^a$ also permits their being inserted into the parts of the housing 1 while the disks 2 are in position.

When the cams 3 are in the position shown in full lines in Figs. 2, 5, 7 and 9 (i. e. with their flattened faces innermost or opposite the peripheries of the disks 2, $2^a$) they do not bind the disks and consequently the latter can rotate freely within the housing, or the housing rotate around the disks; but if the cam members are rocked on their axes, as indicated in Fig. 6, the sides of portions $3^b$ of the cams will contact with the peripheries of the disks 2, $2^a$ and tightly bind the cams thereon, as indicated in Fig. 6 and thus lock the housing securely to the disks 2, $2^a$; and cause the disks to turn with the housing, or vice versa.

In order to produce simultaneous locking and releasing motions of all cams 3, or $3^a$, I provide means whereby the cams are normally caused to interlock the housing and disks so that the disks will be driven by the housing, and whereby if one disk exceeds the other in speed (as when the vehicle is turning), the cams will release the fast disk until the disks (and axle sections) return to same speed, as when the vehicle goes straight ahead, then the cams are operatively engaged to drive both disks alike. The means for so controlling the cams may be greatly varied.

In the construction shown in Figs. 1 to 7, friction members 4, $4^a$ are interposed between the disks 2, $2^a$ and are normally pressed apart by springs $4^b$ (Fig. 1) which hold them in frictional engagement with the inner ends of disks 2, $2^a$. These friction members 4, $4^a$ are normally held in proper relative rotatorial position by means of a spring $4^c$ (Figs. 1, 2 and 3), confined in slots $4^s$ in the rings, and normally tends to prevent relative rotatorial movement of members 4, $4^a$. The extent of relative rotatorial movement of the members 4, $4^a$ may be limited by a pin $4^d$ on one member (as $4^a$) engaging hole $4^e$ in the opposed member (as 4).

Means are provided whereby the rotatorial displacement of either member 4 or $4^a$, will cause a rocking of the related cams 3 or $3^a$, to either release the disks or to interlock the disks with the housing; according to the direction of relative rotary movement of the members 4, $4^a$.

In the construction as shown in Figs. 2, 5, and 6 each friction member 4, $4^a$ has on its outer periphery gear teeth $4^f$ meshing with related gear teeth $3^f$ on the inner ends of the several cams 3, $3^a$. The teeth on the cams 3, $3^a$ and on the frictional members 4, $4^a$ are properly spaced and proportioned so that when the housing is rotated and the frictional members 4, $4^a$ are held static between disks 2, $2^a$, all the cams 3, $3^a$ will be simultaneously slightly revolved about their own axes through the action of the interengaging gear teeth $3^f$, $4^f$ and will turn sufficiently to tightly clutch the disks 2, $2^a$ (see Fig. 6) and interlock the disks and housing.

In Figs. 5 and 6 the cam members are shown as having two teeth $3^f$, like gear teeth, which engage the gear teeth $4^f$ on the friction members. As shown in Fig. 7, the cams 3, $3^a$ might have but one tooth $3^f$ engaging between teeth $4^f$ on the frictional members.

The cams 3, 3ᵃ may be confined against longitudinal movement in the openings 1ᵈ by any suitable means. In the form shown they are retained in the openings 1ᵈ by means of rings 3ʳ, interposed between the outer end portions of the disks 2, 2ᵃ and the outer end walls of the housing sections 1, 1ᵃ, said rings being provided with radially projecting lugs 3ˢ which are slightly narrower than the width of the openings in the inner sides of the bores 1ᵈ; so that the ring may be slipped into the housing-member by letting the lugs 3ˢ project into the bores through the openings in the sides thereof. Any other suitable means might be used to confine the rollers in the bores.

When the housing 1 is rotated one of the cam rollers 3, 3ᵃ will be rotated and immediately lock the related disk to the housing, thereby dragging the related friction member about its own center, and causing all the cams to bind the disk and member, and cause the disk to revolve with the outer housing.

When the vehicle turns, the wheel on the outer arc describes a greater distance than the wheel on the inner arc; and (for example) if the disk 2ᵃ is attached to the wheel traversing the greater arc the disc 2ᵃ will then rotate faster than the disk 2, rollers 3ᵃ will be advanced by the rotation of member 4ᵃ relative to member 4 and cause the cams 3ᵃ to turn in a direction to release or clear the disk 2ᵃ, and the gear teeth 3ᶠ meshing with gear teeth 4ᶠ in member 4 the frictional element 4ᵃ will advance to the limit permitted by pin 4ᵈ (see Figs. 1 and 2), engaging the slightly larger hole 4ᵉ, thereby compressing the coil spring 4ᶜ confined in the slots in the frictional elements 4, 4ᵃ. The spring 4ᶜ, however, will restore the frictional elements 4, 4ᵃ to their original relative normal position as soon as permitted by the equalization of speeds of rotation of disks 2, 2ᵃ, and this movement of the disks will, through the gear teeth 3ᶠ, 4ᶠ, turn the cams 3 back so that when the disks resume the same speed the cams 3 will lock the disk 2ᵃ to the housing thus restoring full traction on both drive wheels.

If spring 4ᶜ were removed, there would probably be more slippage of the driven disk before the related cams would clutch it; but the presence of means (such as pin 4ᵈ loosely fitting in hole 4ᵉ Figs. 1 and 2) would prevent the cams from following the faster wheel and clutching in the forward position while the slower wheel was driving the slower disk. If the spring (as 4ᶜ) was absolutely effective at all times, the pin 4ᵈ would not be necessary; as, when the cams in compensating are shifted to neutral position (Fig. 2), they would not resist the tendency of the spring means to restore the rollers to the normal relative radial positions as soon as the compensating effect was concluded.

The complete gear has an outer driving member (as 1, 1ᵃ) containing cams or clutch elements (as 3, 3ᵃ), which through suitable means (as 4, 4ᵃ) are caused to simultaneously engage the compensating disks 2, 2ᵃ on the axle sections to drive the latter uniformly; it also has a frictional means (as 4, 4ᵃ between disks 2, 2ᵃ) to produce simultaneous rotation of all cams 3, 3ᵃ; it also has means for permitting the cams of either compensating disk to rotate to the point of release when the machine is turning; it also has means of limiting the releasing movement of the cams so that they can go no further; and it also has means for shifting the cams in the compensating half to cause them to re-engage the disk when the vehicle resumes its normal straight ahead movement or the disks 2, 2ᵃ resume the same speeds. The aforesaid several relative functions can be accomplished in various mechanical embodiments of the invention.

Figures 8 and 9 illustrate a modification in which instead of having the cams 3, 3ᵃ provided with teeth engaging the toothed friction members 4, 4ᵃ, the inner ends of the cams are slotted and engaged with opposite ends of torsional spring 5. This spring 5 is made of suitably tempered metal and preferably H-shaped, so that the opposed cams 3, 3ᵃ can be deflected with respect to each other by twisting the spring H, the resultant torsion of the spring tending to restore the cams to their original relative positions when the disks 2, 2ᵃ again acquire equal speeds.

As shown, spring member 5 has an intermediate inwardly projecting finger 5ᵃ which engages an annular friction member 6 interposed between the compensating disks 2, 2ᵃ. The member 6 may be slightly undulated in order to make frictional contact with the opposed faces of the disks 2, 2ᵃ; or any other suitable means may be used to cause the member 6 to frictionally engage with the disks. The member 6 will take up motion with the faster moving disk when one disk moves faster than the other and twist springs 5 so as to rock the related cams (3, 3ᵃ) of the faster moving disk and cause the release or engagement of the cams and the disks substantially in the manner above described.

Figures 10 and 11 illustrate another modification in which torsional spring rods 7 are employed instead of the springs 5. Each rod 7 extends through longitudinal bores in the opposed alined cams 3, 3ᵃ and has its outer ends nonrotatably engaged with the respective cams. Each rod 7 has an inwardly extending arm 7ᵃ which engages a notch 6ᵃ in the frictional spring member 6 between the disks 2, 2ᵃ as above described.

The rods 7 normally hold the opposed cams 3, 3ᵃ in axial alignment, but if one disk rotates faster than the other the frictional member 6 advancing with the faster moving disk will tend to twist and torsionally tension the rods 7, and this twisting of the rods will cause them to shift the cams relative to the faster moving disk as above described; but as soon as the disks resume uniform speed or rotation the torsional action of the spring rods will cause the cams to reengage the disk as above described.

If desired the arms 5ᵃ or 7ᵃ may engage notches or slots cut in the frictional members as 4, 4ᵃ above described, which would produce the same effect on the cams as is produced by the member 6.

If desired the members 4 might be made annular and fitted around the shaft sections a, a', between the disks 2, 2ᵃ, and instead of the spring 4ᵇ bow springs 4ᵛ might be interposed between such members, as indicated in Figure 4, such springs being preferably loosely confined in recesses 4ᵗ in one of the members whereby they will be prevented from displacement rotatorily of the disks.

I at present prefer to employ frictional means between the disks such as illustrated in Figs. 1 to 4; but it is obvious that the frictional means employed may be greatly varied; and also that the connections or means whereby the series of cams are shifted by the frictional means, as required in the effective operation of the compensating gear, may be greatly varied within the scope of the invention.

I claim—

1. A compensating gear comprising a driving member; opposed disks; rocking clutch elements for each disk adapted in one position to lock the same to the driving member; an annular member between the disks and frictionally engaged thereby and provided with peripheral devices operatively engaged with the said clutch elements and adapted to be displaced by the rotary movement of one disk relative to the other, whereby when one disk moves faster than the other the related clutch elements are simultaneously disengaged and the faster disk freed from the driving member; the said clutch elements re-engaging said disk when the disks resume same speed.

2. A compensating gear comprising a driving member; opposed disks; rocking clutch elements for each disk adapted in one position to lock the same to the driving member; annular members between the disks and frictionally engaged thereby and operatively engaging the related clutch elements and adapted to be displaced by the rotary movement of one disk relative to the other, whereby when one disk moves faster than the other, the related clutch elements are simultaneously disengaged and the faster disk freed from the driving member; the said clutch elements re-engaging said disk when the disks resume speed; a spring for normally permitting relative rotary movement of the annular members and for returning them to normal position; and means for limiting the relative rotary movement of the annular members.

3. A compensating gear comprising a driving member; opposed disks; rocking clutch elements for each disk having toothed portions and adapted in one position to lock the disk to the driving member; annular members between the disks and frictionally engaged thereby and operatively engaging the toothed portions of the clutch elements and adapted to be displaced by the rotary movement of one disk relative to the other and whereby when one disk moves faster than the other the related clutch elements are simultaneously disengaged and the faster disk freed from the driving member; the said clutch elements reengaging said disk when the disks resume same speed.

4. A compensating gear comprising a driving member; opposed disks; rocking clutch elements for each disk having toothed portions, and adapted in one position to lock the same to the driving member; annular members between the disks and frictionally engaged thereby and having toothed portions operatively engaging the toothed portions of the clutch elements, and adapted to be displaced by the rotary movement of one disk relative to the other and whereby when one disk moves faster than the other the related clutch elements are simultaneously disengaged and the faster disk freed from the driving member; the said clutch elements re-engaging said disk when the disks resume speed; a spring for normally holding the annular members against relative rotary movement and for returning them to normal position; and means for limiting the relative rotary movement of the annular members.

5. In a compensating gear; a driving member; opposed disks; an annular series of rocking clutch elements mounted in the driving member around each disk, and adapted in one position to lock the same to the driving member; an annular member interposed between the disks and frictionally engaged thereby and provided with peripheral devices operatively engaged with the said clutch elements; and adapted to be displaced by the rotary movement of one disk relative to the other, and whereby when one disk moves faster than the other the related clutch elements are simultaneously disengaged and the disk freed from the driving member; the said clutch elements re-engaging when the disks resume the same speed.

6. In a compensating gear, a driving member, interposed disks; an annular series of rocking clutch elements around each disk adapted in one position to lock the same to the driving member; clutch actuating means interposed between the disks and frictionally engaged therewith and adapted to be displaced by the rotary movement of one disk relative to the other and whereby when one disk moves faster than the other the related clutch elements are simultaneously rocked to disengage said disk from the driving member, said clutch actuating means operatively engaged with the related rocking clutch elements; the said clutch elements re-engaging when the disks resume equal speed.

7. In a compensating gear, a driving member, interposed disks; an annular series of rocking clutch elements around each disk adapted in one position to lock the same to the driving member; clutch actuating means interposed between the disks and frictionally engaged therewith adapted to be displaced by the rotary movement of one disk relative to the other and whereby when one disk moves faster than the other the related clutch elements are rocked to simultaneously disengage said disk from the driving member, said clutch actuating means including a pair of annular members and respectively provided with peripheral devices operatively engaged with the rocking clutch elements; the said clutch elements re-engaging when the disks resume equal speed.

8. In a compensating gear, a driving member, interposed disks; an annular series of rocking clutch elements having toothed portions around each disk adapted in one position to lock the same to the driving member; clutch actuating means interposed between the disks and frictionally engaged therewith adapted to be displaced by the rotary movement of one disk relative to the other and whereby when one disk moves faster than the other the related clutch elements are rocked to simultaneously disengage said disk from the driving member; said clutch actuating means including annular members provided with toothed portions engaging the toothed portions of the rocking clutch elements; the said clutch elements re-engaging when the disks resume equal speed.

9. In a compensating gear, a driving member, interposed disks; an annular series of rocking clutch elements around each disk adapted in one position to lock the same to the driving member; clutch and actuating means interposed between the disks and frictionally engaged therewith adapted to be displaced by the rotary movement of one disk relative to the other and whereby when one disk moves faster than the other the related clutch elements are rocked to simultaneously disengage said disk from the driving member; said clutch actuating means comprising two annular members operatively engaging the related clutch elements; a spring for normally permitting relative rotary movement of the annular members and for returning them to normal positions; and means for limiting the relative rotary movement of the annular members.

10. In a compensating gear, a driving member, interposed disks; an annular series of rocking clutch elements having toothed portions around each disk adapted in one position to lock the same to the driving member; clutch actuating means interposed between the disks and frictionally engaged therewith adapted to be displaced by the rotary movement of one disk relative to the other and whereby when one disk moves faster than the other the related clutch elements are rocked to simultaneously disengage said disk from the driving member; and said clutch actuating means comprising annular members having toothed portions operatively engaging the toothed portions of the clutch elements; a spring for normally holding the annular members against relative rotary movement and for returning them to normal position; and means for limiting the relative rotary movement of the annular members.

11. In a compensating gear; a housing member having an annular series of cylindric bores opening into its interior, disks loosely fitted within the interior of the housing; an annular series of clutch elements fitted in said bores around each disk and adapted in one position to lock the related disks to the housing; clutch actuating means interposed between the disks and frictionally engaged thereby and adapted to be displaced by rotary movement of one disk relative to the other, and whereby when one disk moves faster than the other the related clutch elements are simultaneously disengaged and the disk freed from the casing, the said clutch actuating means comprising an annular member provided with peripheral devices operatively engaged with the said clutch elements; the said elements re-engaging said disk when the disks resume equal speed.

12. In a compensating gear; a housing member having an annular series of cylindric bores opening into its interior; disks loosely fitted within the interior of the housing; an annular series of cylindric rocking clutch elements fitted in said bores around each disk, and adapted in one position to lock the related disks to the housing; clutch actuating means interposed between the disks and in frictional engagement therewith adapted to be displaced by rotary movement of one disk relative to the other, the said means comprising an annular member provided with peripheral devices operatively engaged with the said clutch elements; whereby when one disk moves faster than the other the related clutch elements will be rocked to simultaneously disengage such disk from the casing; the said clutch elements being reengaged with said disk when the disks resume equal speed.

13. In a compensating gear; a housing member having an annular series of cylindric bores opening into its interior; disks loosely fitted within the interior of the housing; an annular series of cylindric rocking clutch elements having toothed portions fitted in said bores around each disk, and adapted in one position to lock the related disks to the housing; clutch actuating means interposed between the disks and in frictional engagement therewith adapted to be displaced by rotary movement of one disk relative to the other, said means comprising annular members interposed between the disks provided with toothed portions engaging the toothed portions of the rocking clutch elements whereby when one disk moves faster than the other the related clutch elements are simultaneously rocked to disengage such disk from the casing.

14. In a compensating gear, a housing member having an annular series of cylindric bores opening into its interior; disks loosely fitted within the interior of the housing; an annular series of cylindric rocking clutch elements fitted in said bores around each disk, and adapted in one position to lock the related disks to the housing; clutch actuating means interposed between the disks and in frictional engagement therewith adapted to be displaced by rotary movement of one disk relative to the other; said means comprising two annular members operatively engaging the related clutch elements; a spring for normally permitting relative rotary movement of the annular members and for returning them to normal position; and means for limiting the relative rotary movement of the annular members whereby when one disk moves faster than the other the related clutch elements are simultaneously rocked to disengage such disk from the casing.

15. In a compensating gear, a housing member having an annular series of cylindric bores opening into its interior; disks loosely fitted within the interior of the housing; an annular series of cylindric rocking clutch elements having toothed portions fitted in said bores around each disk, and adapted in one position to lock the related disks to the housing; clutch actuating means interposed between the disks and in frictional engagement therewith adapted to be displaced by rotary movement of one disk relative to the other; said means between the disks comprising annular members having toothed portions operatively engaging the tooth portions of the clutch elements; a spring for normally holding the annular members against relative rotary movement and for returning them to normal position; and means for limiting the relative rotary movement of the annular members, whereby when one disk moves faster than the other the related clutch elements are simultaneously rocked to disengage such disk from the casing.

16. In a compensating gear the combination of a housing, a pair of opposed disks loosely fitted within the housing; said housing having a series of cylindric bores adjacent the peripheries of the disks, said bores being open on the sides adjacent the disks; cylindrical rocking clutch elements having flattened sides in said bores adapted when rocked to engage the related disks; frictional means frictionally engaging the disks and operatively engaging the clutch elements to cause the latter to simultaneously lock when both disks are rotating at same speed; and whereby the clutch elements of the faster moving disk are simultaneously rocked to bring the flattened portions of the clutch elements opposite the disks.

17. In a compensating gear as set forth in claim 16 said friction means comprising an annular member provided with peripheral devices operatively engaged with the related rocking clutch elements.

18. In a compensating gear as set forth in claim 16 said friction means comprising a pair of annular members interposed between the disks and provided with peripheral devices respectively operatively engaged with the rocking clutch elements to operate the latter.

19. In a compensating gear as set forth in claim 16 the rocking clutch elements having toothed portions, and said friction means comprising annular members interposed between the disks provided with toothed portions engaging the toothed portions on the rocking clutch elements to operate the latter.

20. In a compensating gear as set forth in claim 16 the frictional means between the disks comprising two annular members operatively engaging the related clutch elements; a spring for normally permitting relative rotary movement of the annular members and for returning them to normal position; and means for limiting the relative rotary movement of the annular members.

21. In a compensating gear as set forth in claim 16 the rocking clutch elements having toothed portions and said friction means between the disks comprising annular members having toothed portions operatively engaging the toothed portions of the clutch elements, a spring for normally holding the annular members against relative rotary movement and for returning them to normal position; and means for limiting the relative rotary movement of the annular members.

In testimony that I claim the foregoing as my own, I affix my signature.

DAVID E. ROSS.